US008490011B2

(12) United States Patent
Stapleton et al.

(10) Patent No.: US 8,490,011 B2
(45) Date of Patent: Jul. 16, 2013

(54) DISPLAY OF SUPPLEMENTARY INFORMATION ON A GRAPHICAL USER INTERFACE

(75) Inventors: James Patrick Stapleton, Plano, TX (US); James Anthony Gewecke, Dallas, TX (US); Justin Nicholas Marcucci, Chester, NJ (US); Lee Culver, Carrollton, TX (US); David James Krantz, Santa Monica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 443 days.

(21) Appl. No.: 12/277,630

(22) Filed: Nov. 25, 2008

(65) Prior Publication Data

US 2009/0288005 A1 Nov. 19, 2009

Related U.S. Application Data

(60) Provisional application No. 61/127,633, filed on May 14, 2008.

(51) Int. Cl.
G06F 3/048 (2006.01)

(52) U.S. Cl.
USPC .............................. 715/790; 715/705; 715/788

(58) Field of Classification Search
USPC .................. 715/705, 711, 715, 764, 765, 781, 715/788, 790, 800, 856, 862, 866; 345/156, 345/157, 163
See application file for complete search history.

(56) References Cited

U.S. PATENT DOCUMENTS

| | | | |
|---|---|---|---|
| 5,155,806 A | 10/1992 | Hoeber et al. | |
| 5,157,768 A | 10/1992 | Hoeber et al. | |
| 5,388,251 A | 2/1995 | Makino et al. | |
| 7,100,123 B1* | 8/2006 | Todd et al. | 715/862 |
| 7,149,968 B1* | 12/2006 | Ackerschewski et al. | 715/255 |
| 7,673,251 B1* | 3/2010 | Wibisono | 715/771 |
| 2002/0075409 A1* | 6/2002 | Kwon et al. | 348/569 |
| 2002/0180697 A1* | 12/2002 | Freiberger et al. | 345/156 |
| 2002/0184339 A1* | 12/2002 | Mackintosh et al. | 709/218 |
| 2004/0117442 A1* | 6/2004 | Thielen | 709/203 |
| 2005/0268234 A1* | 12/2005 | Rossi et al. | 715/705 |
| 2007/0106956 A1* | 5/2007 | Platt et al. | 715/808 |
| 2007/0113180 A1 | 5/2007 | Danninger | |
| 2008/0109722 A1 | 5/2008 | Gengler et al. | |
| 2008/0178223 A1* | 7/2008 | Kwoh et al. | 725/43 |
| 2008/0244460 A1* | 10/2008 | Louch | 715/856 |
| 2008/0301558 A1* | 12/2008 | Najafi et al. | 715/708 |
| 2009/0049408 A1* | 2/2009 | Naaman et al. | 715/835 |
| 2010/0146546 A1* | 6/2010 | Nishimura et al. | 725/39 |

* cited by examiner

*Primary Examiner* — Xiomar L Bautista
(74) *Attorney, Agent, or Firm* — Wolff & Sampson, PC

(57) ABSTRACT

Disclosed are method and apparatus for displaying supplementary information on a graphical user interface. A request for supplementary information is received. The supplementary information is retrieved and displayed in a reserved display field in a graphical user interface. The reserved display field may be configured by a user to adapt to specific applications, but remains stationary throughout the user session. The reserved display field does not obstruct any other display fields in the graphical user interface. A request for supplementary information may be generated by using a mouse to first position a cursor over an active display element. A request for supplementary information associated with the active display element may be generated by clicking the mouse, or by holding the cursor stationary for a time interval greater than a threshold dwell time.

18 Claims, 8 Drawing Sheets

DISPLAY OF SUPPLEMENTARY INFORMATION ON A GRAPHICAL USER INTERFACE

This application claims the benefit of U.S. Provisional Application No. 61/127,633 filed May 14, 2008, which is incorporated herein by reference.

BACKGROUND OF THE INVENTION

The present invention relates generally to display of information on a graphical user interface, and more particularly to display of supplementary information.

A graphical user interface (GUI) is an effective mechanism for a user to provide input to and receive output from software applications. As software applications have grown increasingly more complex, GUIs have correspondingly grown increasingly more complex. Particularly sophisticated GUIs have been developed for interaction with websites on the Internet. These GUIs are commonly referred to as web browsers. Via a GUI, a user may enter information, retrieve information, and execute commands. A common user input device for interacting with a GUI is a mouse. For example, to execute a command, the user may use a mouse to first position a cursor over a virtual function key and then click the mouse to execute the command.

Many websites support multiple multimedia tasks: displaying text and graphics, playing music and videos, sending e-mail, and performing information searches are only a few examples. Often, many multimedia tasks are grouped together on a single webpage. As the number of virtual function keys on a single webpage has increased, the size of virtual function keys has correspondingly decreased to avoid consuming a large portion of display space. Consequently, virtual function keys often have minimal associated text or no associated text (icons). At the same time, as the variety and complexities of functions supported by a GUI continue to increase, it becomes less clear what function is associated with a specific virtual function key. A popular solution for clarifying operations is to display supplementary information (such as "help" information) providing more details associated with a specific function key. In some instances, the user positions the cursor over a region (for example, marked with a "?") next to the virtual function key and clicks the mouse to display help information. In other instances, the user maintains the cursor in a stationary position over the virtual function key and help information is automatically displayed. Typically, the help information is displayed in a help window in the neighborhood around the virtual function key. Consequently, the primary information in this neighborhood is blocked. This mode of presentation may be deleterious if the help information references the primary information in the neighborhood itself.

A mode of presentation similar to a help window may also be used to display supplementary information associated with other information elements. In one example, a user may position the cursor over the keyword "indium" in a chemistry article. A display window containing key physical parameters (such as melting point) and a synopsis of industrial applications may automatically open up. In a second example, a user may position a cursor over a financial chart. A display window containing an explanation of the axes of the chart and providing details of the plotted data may open up. In a third example, a user may position the cursor over a specific component in an assembly diagram. A display window containing instructions on how to connect the specific component to another component may open up. As in the case of a help window, however, the display window blocks the primary information in the neighborhood of the information element of interest. For example, if the display window blocks a portion of the assembly diagram, the user needs to toggle the display window on and off to refer to the assembly diagram while reading the assembly instructions. What are needed are method and apparatus for displaying help and other supplementary information without blocking primary information of interest on a GUI.

BRIEF SUMMARY OF THE INVENTION

In an embodiment of the invention, a request for supplementary information is received. The supplementary information is retrieved and displayed in a reserved display field in a graphical user interface. The reserved display field may be configured by a user to adapt to specific applications, but remains stationary throughout the user session. The reserved display field does not obstruct any other display fields in the graphical user interface. A request for supplementary information may be generated by using a mouse to first position a cursor over an active display element. A request for supplementary information associated with the active display element may be generated by clicking the mouse, or by holding the cursor stationary for a time interval greater than a threshold dwell time.

These and other advantages of the invention will be apparent to those of ordinary skill in the art by reference to the following detailed description and the accompanying drawings.

DETAILED DESCRIPTION

Figure 1:
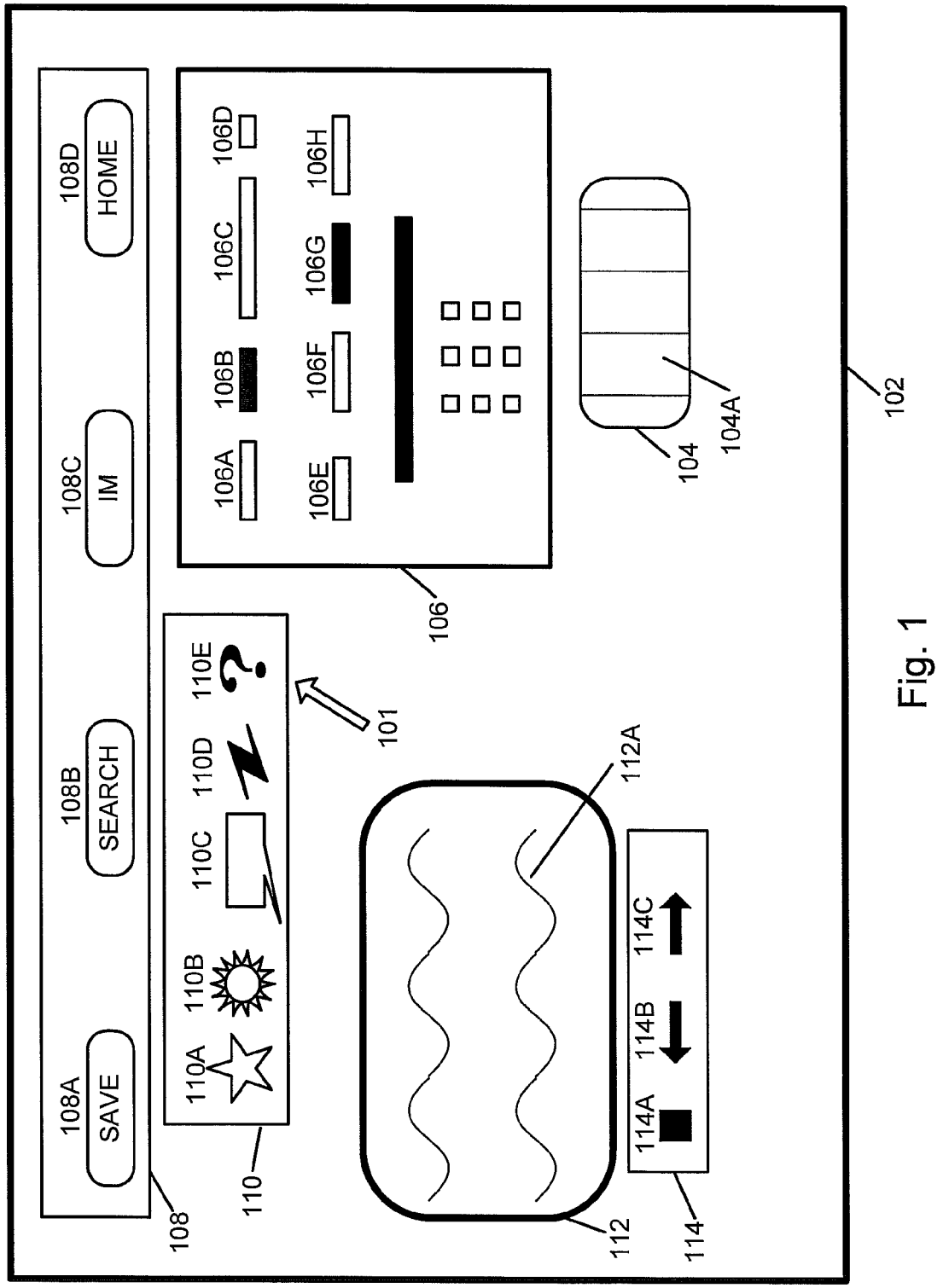
FIG. 1 shows a schematic of a webpage displayed on a video display.

FIG. 1 is a high-level schematic of a webpage 102 displayed on a display such as a computer monitor. Represented are examples of various display fields. Display field 108 contains virtual function key 108A-virtual function key 108E, which are labeled with some associated text. Some virtual function keys, such as virtual function key 108A ("SAVE") and virtual function key 108B ("SEARCH"), have acquired some degree of universal meaning, although the details of the operation are still application specific (for example, SAVE what to where?). Display field 110 contains icon 110A-icon 110E, which are devoid of associated text. Again, although some icons have acquired some degree of universal meaning, the details of the operation represented by an icon are typically highly application specific. Display field 112 is a display field in which multimedia content 112A (such as audiovisual presentations) may be played. Display field 114 contains virtual control key 114A-virtual control key 114C for operating a video player. Display field 106 displays text elements. Text element 106A-text element 106H are representative text elements. Lastly, display field 104 contains still image 104A.

Herein, all the information elements displayed on webpage 102 are referred to as display elements. Display elements include all the information elements in display field 104-display field 114. Herein, an active display element refers to a display element which has associated supplementary information. As discussed above, supplementary information may refer to help information associated with virtual function key 108A, icon 110B, and virtual control key 114C. Supplementary information may refer to explanatory or more detailed information associated with multimedia content 112A playing in display field 112 and still image 104A shown in display field 104. Supplementary information may also be associated with active text elements in display field 106. Text element 106B and text element 106G, indicated by black bars, are representative active text elements. For example, if active text element 106B is the name of a singer, supplementary information may include a discography. As another example, if active text element 106G is the name of a company, supplementary information may include a graph of its stock price over the past month. Supplementary information is commonly provided as text. In general, as used herein, supplementary information may be presented in any mode, including text, drawings, graphs, still images, and audiovisual presentations. Herein, audiovisual presentations include presentations with audio only (with a background display, for example), presentations with video only, and presentations with a combination of audio and video.

Also shown in FIG. 1 is cursor 101. The position of cursor 101 may be moved by a user via a user input device such as a mouse. The user input device may also be used to transmit a control signal to execute a function associated with a virtual function key, such as virtual function key 108C. This operation is commonly referred to as clicking the mouse. In the embodiments of the invention discussed below, a mouse is used as an example of a user input device which a user may use to position a cursor on a display and which a user may use to transmit a control signal to execute a command. Other examples of user input devices include keyboards, digitizing tablets, and joysticks.

Figure 2:
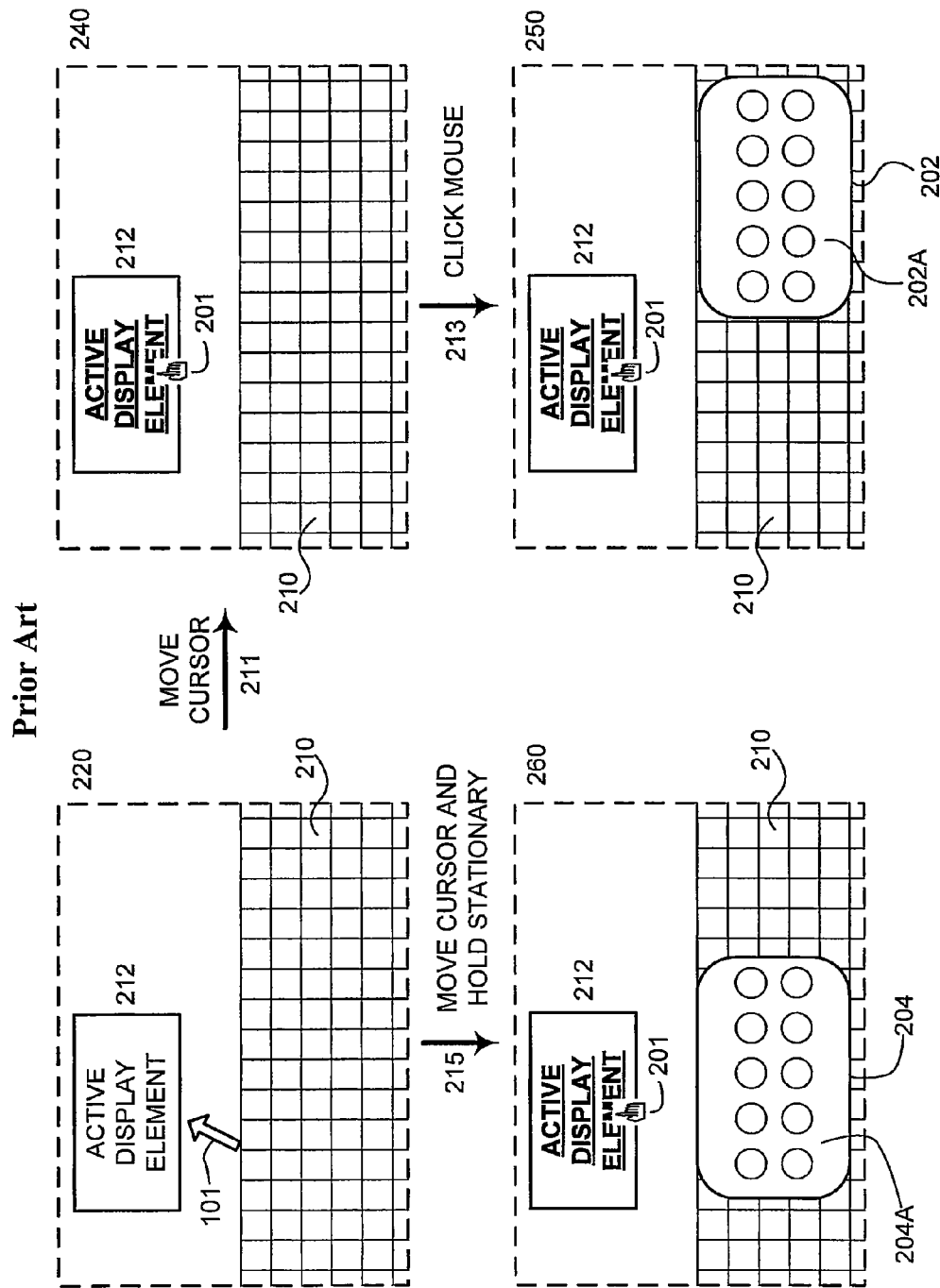
FIG. 2 shows examples of processes for displaying supplementary information in a display window.

FIG. 2 illustrates prior-art schemes for displaying supplementary information. Shown in initial display sequence 220 are cursor 101 and active display element 212. The grids in neighboring display field 210 represent the display field in a neighborhood around active display element 212. In one scheme, the user moves the cursor over active display element 212 (via operation 211). The results are shown in display sequence 240. Cursor 101 has changed from a default shape (typically an arrow) indicating position to a different shape (typically a hand, as in cursor 201) indicating selection of an active display element. The active display element is commonly highlighted when it has been selected. For example, if the active display element is an active text element, the text may be highlighted by color font, bold font, or underlined font (or combinations of color, bold, and underline). The user then clicks on the selected active display element 212 (via operation 213). The results are shown in display sequence 250. A supplementary display window 202, such as a help window, has opened up. The circles within supplementary display field 202 represent the supplementary information 202A. In all the examples discussed below, circles represent supplementary information. Note that supplementary display window 202 blocks a portion of neighboring display field 210.

In a second scheme, the user may display supplementary information without explicitly clicking the mouse. Starting with the initial display sequence 220, the user moves the cursor over the active display element 212 and holds the cursor 201 stationary for a time interval exceeding a threshold dwell time (via operation 215). Supplementary display window 204, containing supplementary information 204A, then automatically opens up. Note that supplementary display window 204 blocks a portion of neighboring display field 210.

Figure 3:
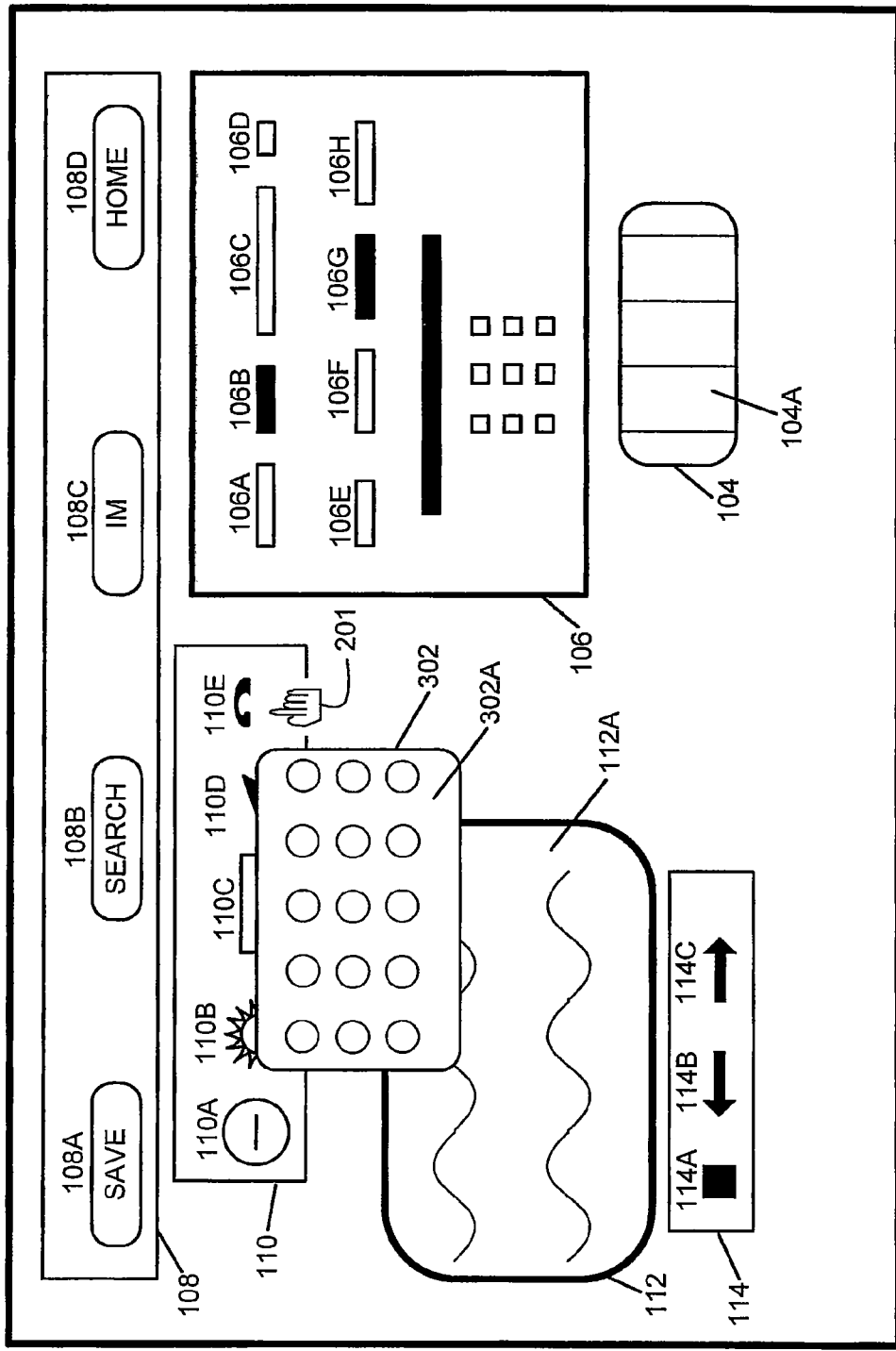
FIG. 3 shows a first example of a display window obstructing primary information.
Figure 4:
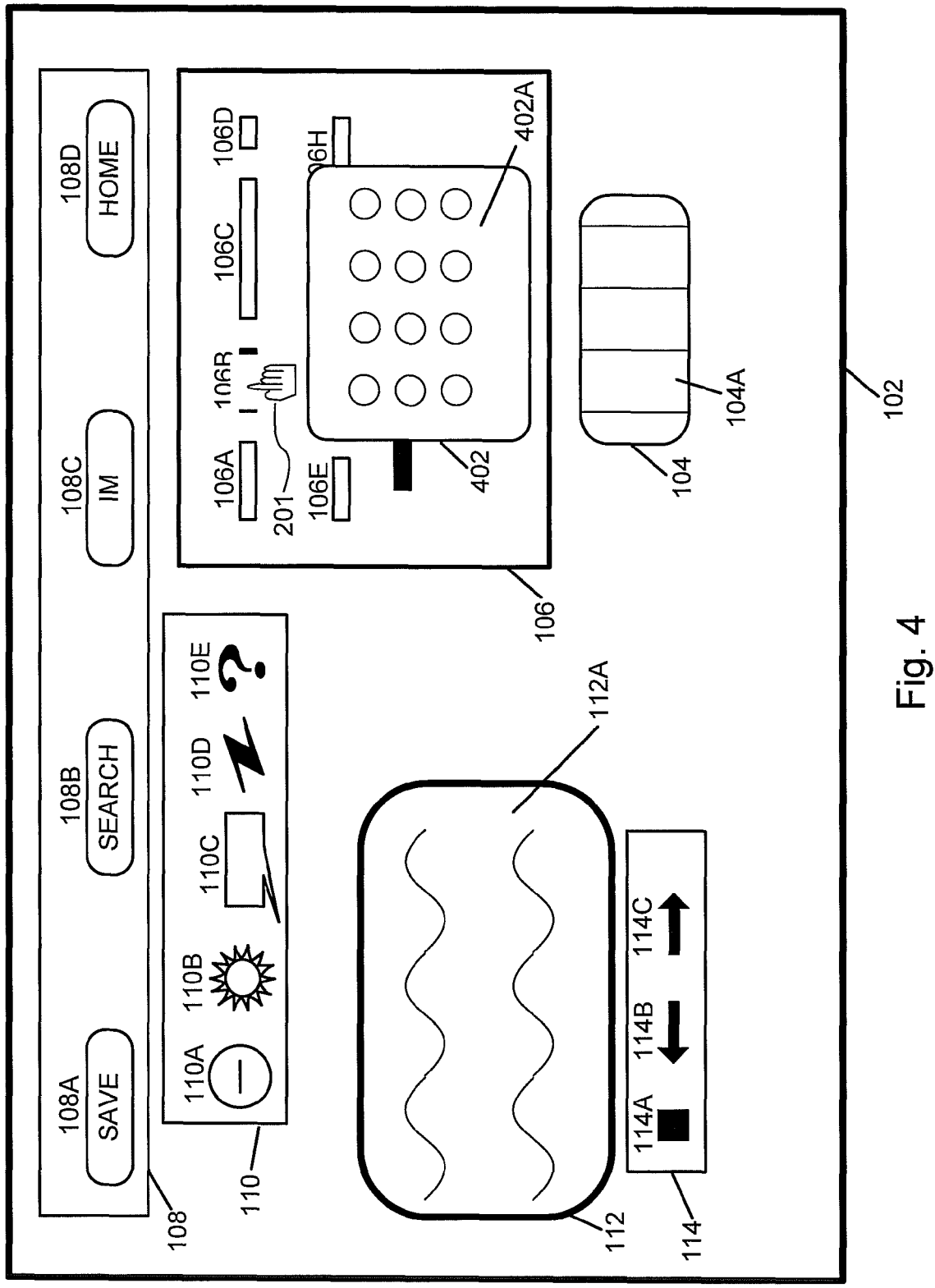
FIG. 4 shows a second example of a display window obstructing primary information.

FIG. 3 and FIG. 4 illustrate some disadvantages of the prior-art display schemes. In FIG. 3, icon 110E has been selected by cursor 201. The supplementary display window 302, containing supplementary information 302A, blocks a portion of display field 110 and display field 112. In FIG. 4, active display element 106B (which is an active text element) has been selected by cursor 201. The supplementary display window 402, containing supplementary information 402A, blocks a portion of display field 106.

Figure 5:
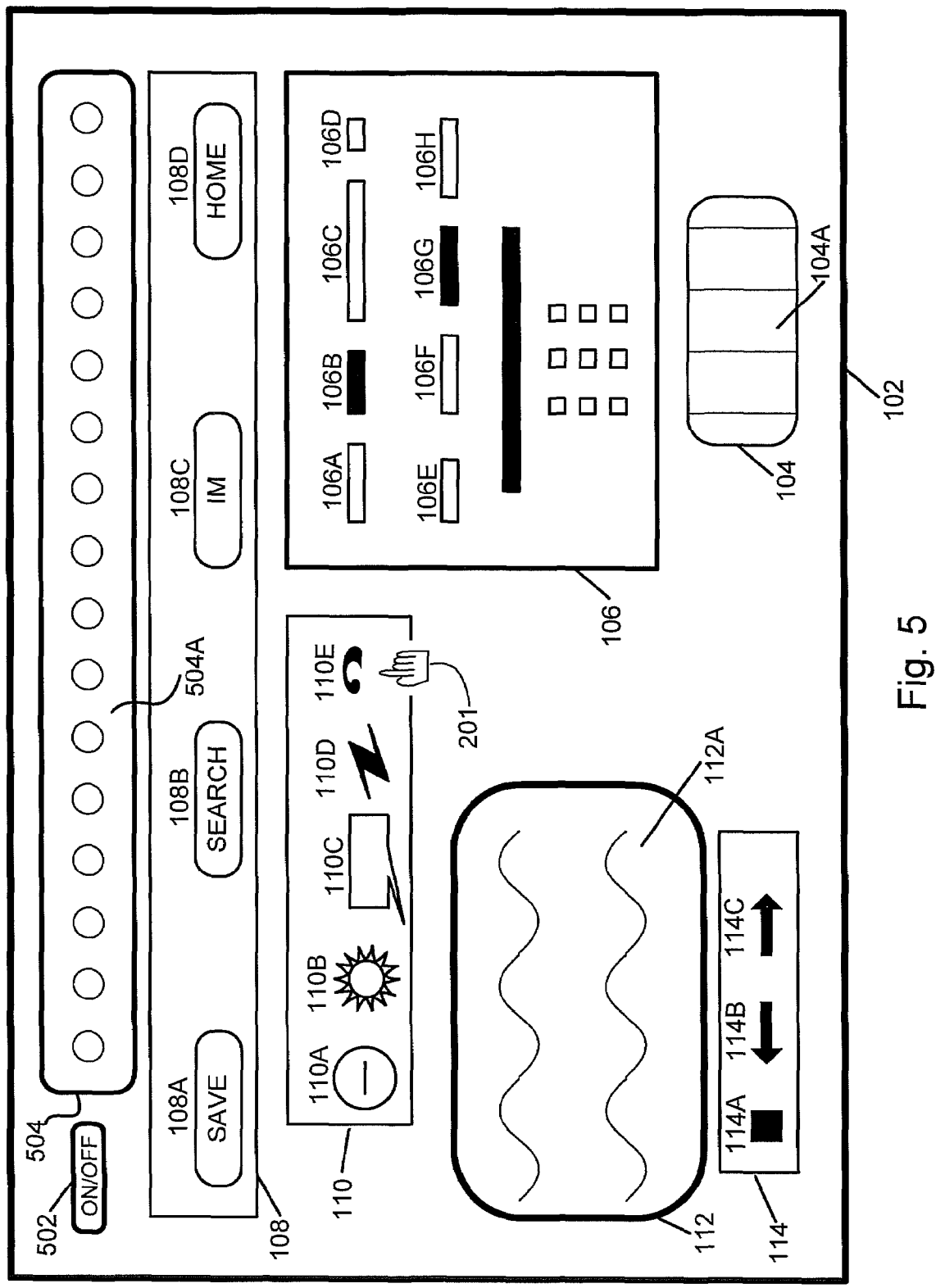
FIG. 5 shows an example of displaying help information, according to an embodiment of the invention.
Figure 6:
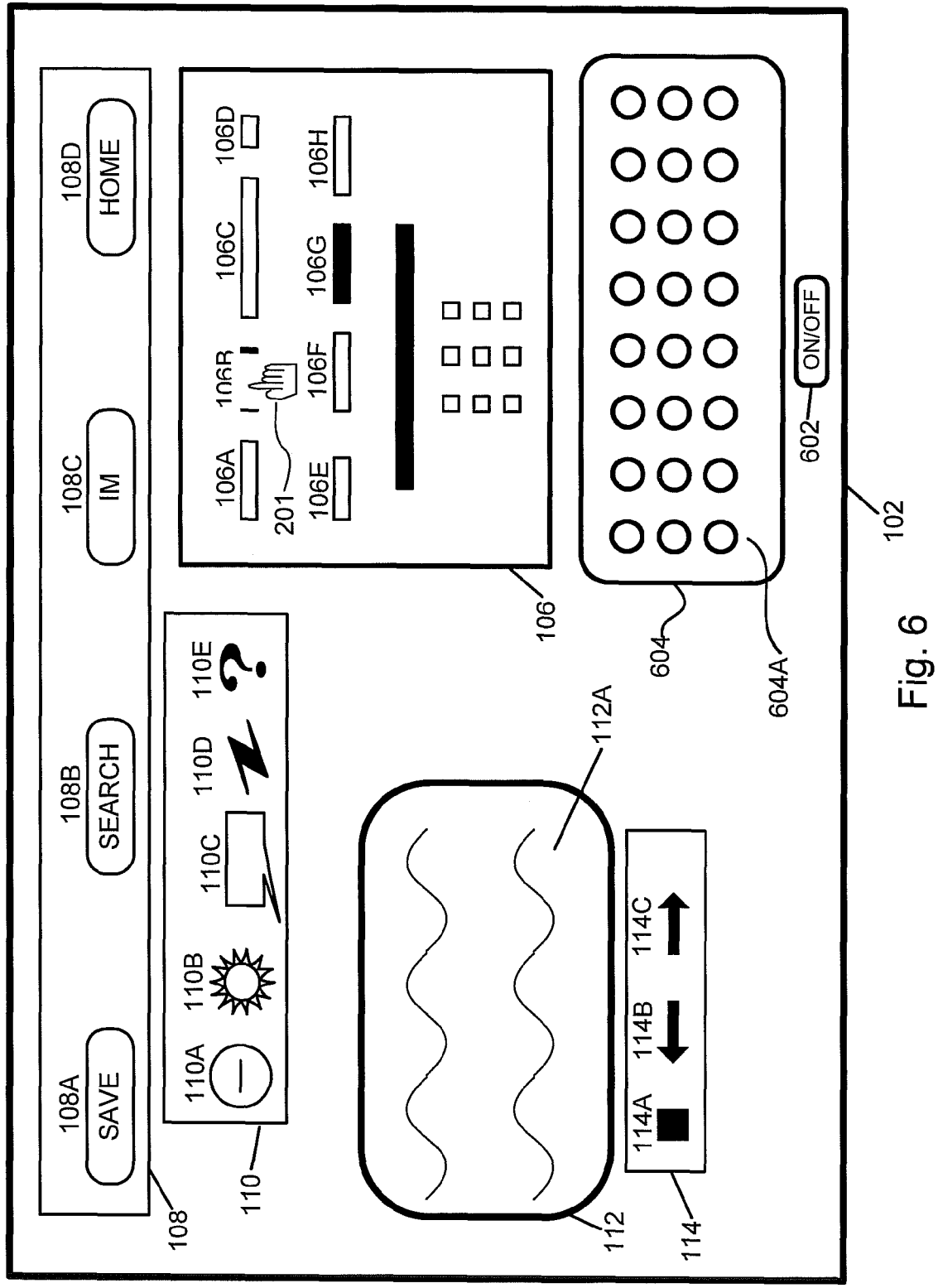
FIG. 6 shows an example of displaying supplementary information, according to an embodiment of the information.

FIG. 5 and FIG. 6 illustrate displays of supplementary information according to embodiments of the invention. In FIG. 5, reserved display field 504 is reserved for display of supplementary information. Virtual function key 502 permits the user to turn on or off the display of supplementary information 504A. The position, size, and shape of reserved display field 504 are initially configurable by the user to adapt to a specific application. In this example, reserved display field 504 has been configured to display brief help text. The reserved display field 504 then remains static during the user session. Reserved display field 504 does not impinge upon any other display field, such as display field 104-display field 114, on webpage 102. In FIG. 5, icon 110E has been selected by cursor 201. Help information associated with icon 110E is displayed as supplementary information 504A in reserved display field 504. Display field 104-display field 114 remain unobstructed.

In the embodiment shown in FIG. 6, reserved display field 604 has been configured to display a wider range of supplementary information 604A, which may include, for example, text, drawings, graphs, still images, and audiovisual presentations. Virtual function key 602 permits the user to turn on and off display of supplementary information 604A. In FIG. 6, active text element 106B has been selected by cursor 201. Supplementary information associated with active text element 106B is displayed as supplementary information 604A in reserved display field 604. Display field 104-display field 114 remain unobstructed.

Figure 7:
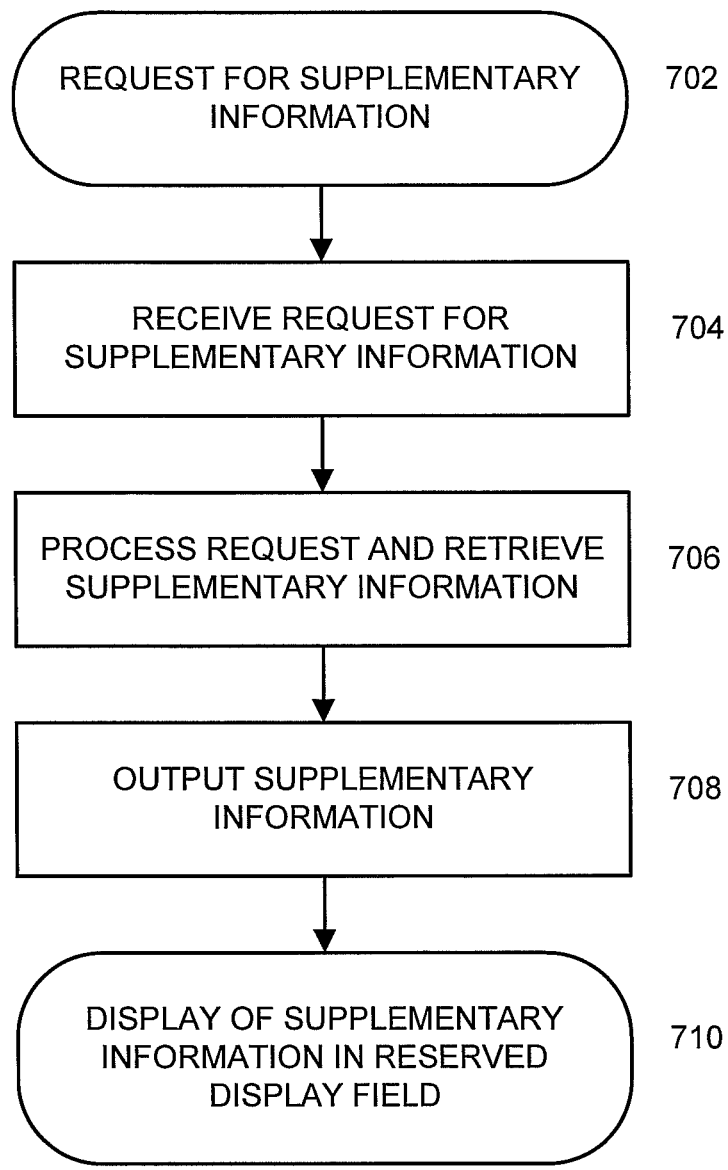
FIG. 7 shows a flowchart of steps for displaying supplementary information, according to an embodiment of the invention.

FIG. 7 shows a flowchart of steps for displaying supplementary information, according to embodiments of the invention. In step 704, a request for supplementary information 702 is received by a supplementary information processing module for retrieving and displaying supplementary information. The request for supplementary information may be generated by a user using a mouse to first select an active display element (such as icon 110E in FIG. 5 or active text element 106B in FIG. 6) by moving a cursor (such as cursor 201 in FIG. 5 and FIG. 6) over the active display element. In one embodiment, the user then generates the request by clicking on the mouse. In another embodiment, the user then generates the request by holding the cursor stationary for a time interval exceeding a threshold dwell time. The threshold dwell time is a parameter which may be configured in a program controlling operations of the mouse. The act of clicking on the mouse or the act of holding the cursor stationary generates a control signal which initiates execution of a command to generate the request. The process then passes to step 706, in which the supplementary information processing module processes the request and retrieves the supplementary information. The process then passes to step 708, in which the supplementary information processing module outputs the requested supplementary information. The output 710 of the process is the display of the supplementary information (such as supplementary information 504A in FIG. 5 and supplementary information 604A in FIG. 6) in a reserved display field (such as reserved display field 504 in FIG. 5 and reserved display field 604 in FIG. 6).

One skilled in the art may develop and apply an embodiment of the invention to standalone applications with a graphical user interface. For example, computer-based training sessions (such as coursework) and computer-based reference works (such as an encyclopedia) may be loaded onto a standalone personal computer. Presentation of information may include active display elements with associated supplementary information.

Figure 8:
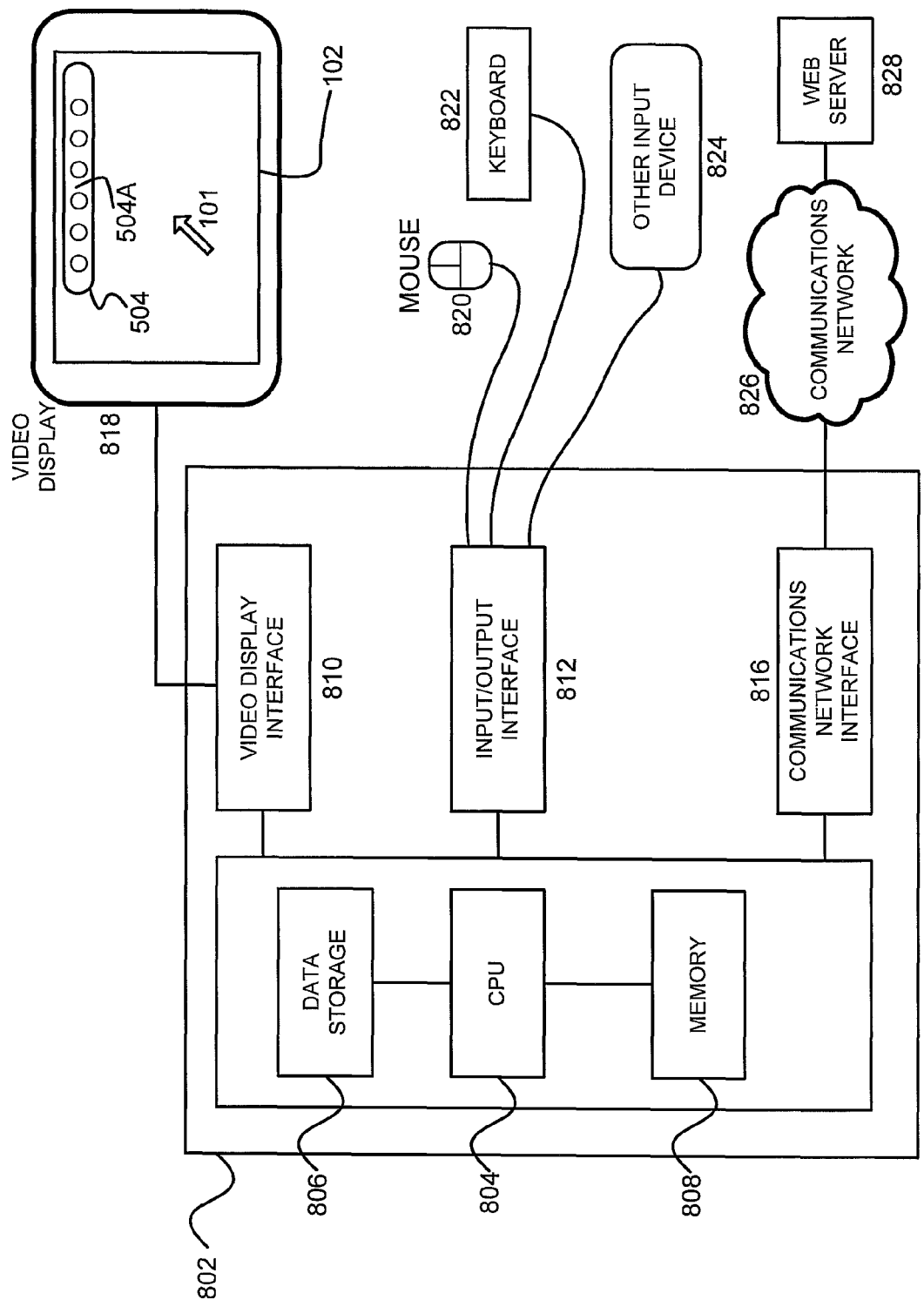
FIG. 8 shows a high-level schematic of a computer.

One embodiment of a supplementary information processing module may be implemented using a computer. The steps shown in the flowchart in FIG. 7 may be executed using a computer. As shown in FIG. 8, computer 802 may be any type of well-known computer comprising a central processing unit (CPU) 804, memory 808, data storage 806, and user input/output interface 812. Data storage 806 may comprise a hard drive or non-volatile memory. User input/output interface 812 may comprise a connection to a mouse 820, a keyboard 822, or other input device 824, such as a digitizing tablet or joystick. As is well known, a computer operates under control of computer software which defines the overall operation of the computer and applications. CPU 804 controls the overall operation of the computer and applications by executing computer program instructions which define the overall operation and applications. The computer program instructions may be stored in data storage 806 and loaded into memory 808 when execution of the program instructions is desired. Computer 802 may further comprise a video display interface 810, which may transform signals from CPU 804 to signals which may drive video display 818. Video display 818 may display webpage 102, cursor 101, reserved display field 504, and supplementary information 504A. Computer 802 may further comprise one or more network interfaces. For example, computer 802 may access web server 828 via communications network interface 816 and communications network 826. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for displaying supplementary information on a graphical user interface of a webpage comprising:
maintaining supplementary information associated with a plurality of active display elements, the plurality of active display elements comprising text elements, control keys for operating a video player, icons devoid of associated text, and multimedia content;
presenting the plurality of active display elements on the webpage during a user session;
receiving a request to activate a reserved display field reserved for presenting supplementary information during the user session;
determining a location on the webpage for presenting the reserved display field, wherein the location does not impinge upon the plurality of active display elements presented on the webpage and wherein the reserved display field remains static at the location on the webpage for a period of time during the user session;
configuring a size and a shape of the reserved display field to adapt the reserved display field to a specific application;
presenting the reserved display field on the webpage such that the reserved display field remains stationary at the location on the webpage during the user session;
receiving a request for supplementary information associated with an active display element of the plurality of active display elements presented on the webpage;
presenting the supplementary information on the webpage, within the reserved display field such that the plurality of active display elements and the reserved display field remain unobstructed on the webpage, the supplementary information comprising help information associated with the active display element and presented as an audiovisual presentation; and
receiving user input, via a virtual function key, to turn off and turn on display of the supplementary information presented within the reserved display field.

2. The method of claim 1, wherein the receiving a request for supplementary information further comprises:
receiving a position of a cursor, wherein the position of the cursor is located over the active display element.

3. The method of claim 2, wherein:
presenting the supplementary information on the webpage within the reserved display field is in response to the position of the cursor remaining stationary for a time interval exceeding a threshold dwell time.

4. The method of claim 2, further comprising:
positioning the cursor over the active display element in response to a motion of a mouse.

5. The method of claim 1, wherein:
presenting the supplementary information on the webpage, within the reserved display field is in response to a click of a mouse.

6. The method of claim 1, wherein presenting the supplementary information on the webpage within the reserved display field comprises displaying one of:
a text;
a drawing;
a graph; and
a still image.

7. An apparatus for displaying supplementary information on a graphical user interface of a webpage comprising:
means for maintaining supplementary information associated with a plurality of active display elements, the plurality of active display elements comprising text elements, control keys for operating a video player, icons devoid of associated text, and multimedia content;
means for presenting the plurality of active display elements on the webpage during a user session;
means for receiving a request to activate a reserved display field reserved for presenting supplementary information during the user session;

means for determining a location on the webpage for presenting the reserved display field, wherein the location does not impinge upon plurality of the active display elements presented on the webpage and wherein the reserved display field remains static at the location on the webpage for a period of time during the user session;

means for configuring a size and a shape of the reserved display field to adapt the reserved display field to a specific application;

means for presenting the reserved display field on the webpage such that the reserved display field remains stationary at the location on the webpage during the user session;

means for receiving a request for supplementary information associated with an active display element of the plurality of active display elements presented on the webpage;

means for presenting the supplementary information on the webpage, within the reserved display field such that the plurality of active display elements and the reserved display field remain unobstructed on the webpage, the supplementary information comprising help information associated with the active display element and presented as an audiovisual presentation; and means for receiving user input, via a virtual function key, to turn off and turn on display of the supplementary information presented within the reserved display field.

8. The apparatus of claim 7, wherein the means for receiving a request for supplementary information further comprises:

means for receiving a position of a cursor, wherein the position of the cursor is located over the active display element.

9. The apparatus of claim 8, further comprising:

means for presenting the supplementary information on the webpage within the reserved display field in response to the position of the cursor remaining stationary for a time interval exceeding a threshold dwell time.

10. The apparatus of claim 8, further comprising:

means for positioning the cursor over the active display element in response to a motion of a mouse.

11. The apparatus of claim 7, further comprising:

means for presenting the supplementary information on the webpage, within the reserved display field in response to a click of a mouse.

12. The apparatus of claim 7, wherein the means for presenting the supplementary information on the webpage within the reserved display field comprises means for displaying one of:

a text;
a drawing;
a graph; and
a still image.

13. A computer readable medium storing computer program instructions for presenting supplementary information on a graphical user interface of a webpage, which, when executed on a processor, cause the processor to perform operations comprising:

maintaining supplementary information associated with a plurality of active display elements, the plurality of active display elements comprising text elements, control keys for operating a video player, icons devoid of associated text, and multimedia content;

presenting the plurality of active display elements on the webpage during a user session;

receiving a request to activate a reserved display field reserved for presenting the supplementary information during the user session;

determining a location on the webpage for presenting the reserved display field, wherein the location does not impinge upon the plurality of active display elements presented on the webpage and wherein the reserved display field remains static at the location on the webpage-for a period of time during the user session;

configuring a size and a shape of the reserved display field to adapt the reserved display field to a specific application;

presenting the reserved display field on the webpage such that the reserved display field remains stationary at the location on the webpage during the user session;

receiving a request for supplementary information associated with an active display element of the plurality of active display elements presented on the webpage;

presenting the supplementary information on the webpage, within the reserved display field such that the plurality of active display elements and the reserved display field remain unobstructed on the webpage, the supplementary information comprising help information associated with the active display element and presented as an audiovisual presentation; and receiving user input, via a virtual function key, to turn off and turn on display of the supplementary information presented within the reserved display field.

14. The computer readable medium of claim 13, wherein the receiving a request for supplementary information further comprises:

receiving a position of a cursor, wherein the position of the cursor is located over the active display element.

15. The computer readable medium of claim 14, the operations further comprising:

presenting the supplementary information on the webpage within the reserved display field in response to the position of the cursor remaining stationary for a time interval exceeding a threshold dwell time.

16. The computer readable medium of claim 14, the operations further comprising:

positioning the cursor over the active display element in response to a motion of a mouse.

17. The computer readable medium of claim 13, the operations further comprising:

presenting the supplementary information on the webpage within the reserved display field in response to a click of a mouse.

18. The computer readable medium of claim 13, the operations further comprising displaying one of:

a text;
a drawing;
a graph; and
a still image.

* * * * *

UNITED STATES PATENT AND TRADEMARK OFFICE
CERTIFICATE OF CORRECTION

| | | |
|---|---|---|
| PATENT NO. | : 8,490,011 B2 | Page 1 of 1 |
| APPLICATION NO. | : 12/277630 | |
| DATED | : July 16, 2013 | |
| INVENTOR(S) | : James Patrick Stapleton et al. | |

It is certified that error appears in the above-identified patent and that said Letters Patent is hereby corrected as shown below:

On the Title Page, item (75), in the Inventors section, David James Krantz should read --David Jason Krantz--

On the Title Page, Primary Examiner section, Xiomar L Bautista should read --Xiomara L Bautista--

On the Title Page, item (74), in the Attorney, Agent or Firm section, Wolff & Sampson, PC should read --Wolff & Samson, PC--

Signed and Sealed this
Eighteenth Day of March, 2014

Michelle K. Lee
*Deputy Director of the United States Patent and Trademark Office*